July 24, 1956  E. H. MARPLE  2,756,094
COLLAPSIBLE TRAILER
Filed Oct. 13, 1951  2 Sheets-Sheet 1

INVENTOR.
ERNEST H. MARPLE
BY
Walter J. Stevenson
AGENT.

July 24, 1956 — E. H. MARPLE — 2,756,094
COLLAPSIBLE TRAILER
Filed Oct. 13, 1951 — 2 Sheets-Sheet 2
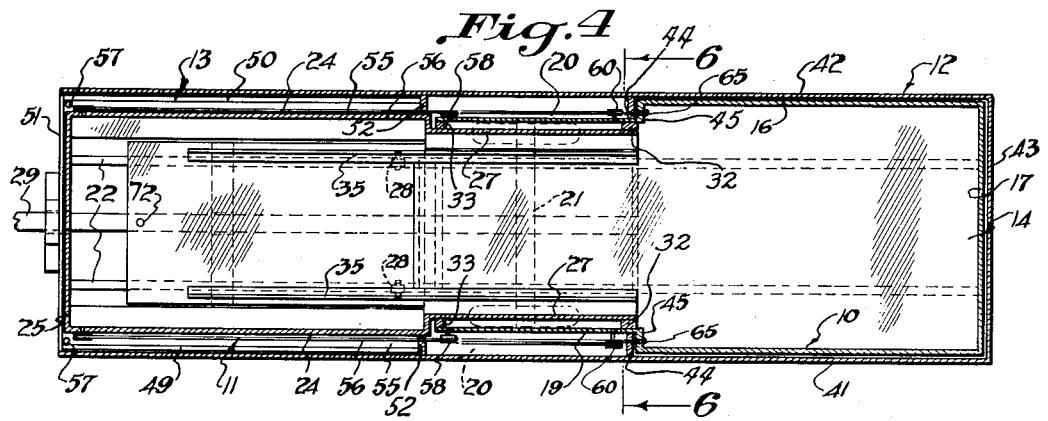
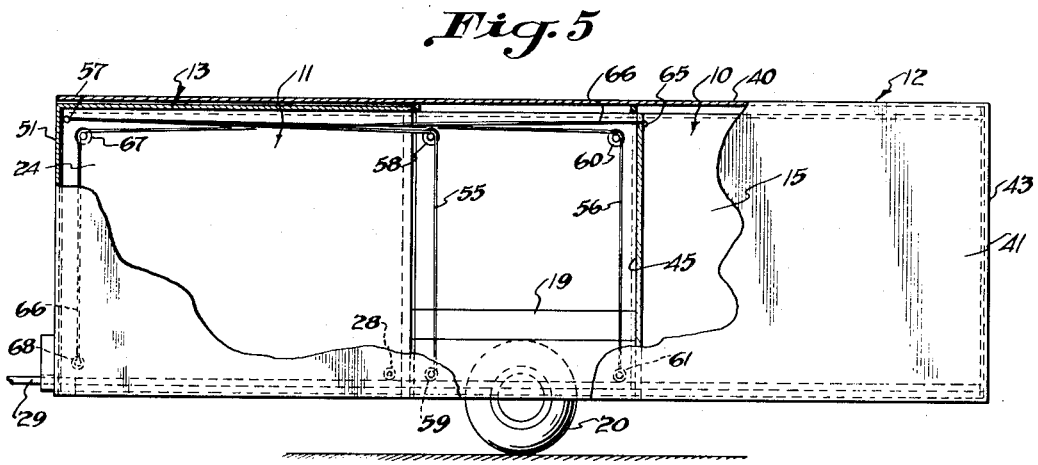
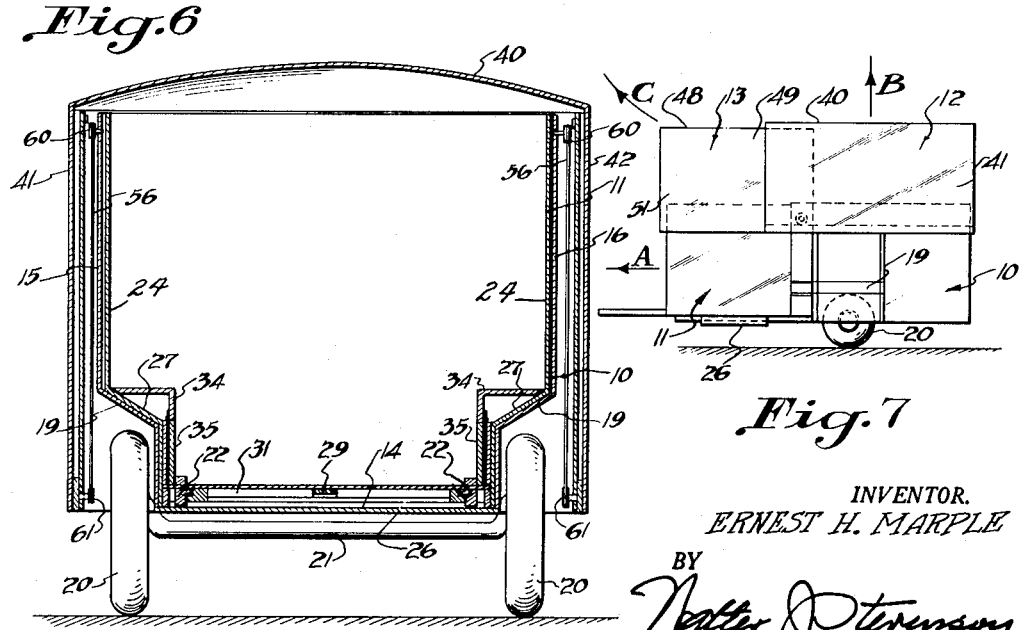
INVENTOR.
ERNEST H. MARPLE

United States Patent Office 2,756,094
Patented July 24, 1956

2,756,094

COLLAPSIBLE TRAILER

Ernest H. Marple, Los Angeles, Calif.

Application October 13, 1951, Serial No. 251,191

1 Claim. (Cl. 296—23)

My invention relates generally to trailers as used for living quarters and camping purposes, and more particularly to a trailer of a collapsible type. Specifically, the invention pertains to improvements in collapsible trailers of the character disclosed in my Patent No. 2,343,261, issued to me March 7, 1944, for Collapsible Trailer.

My patented trailer, referred to above, comprises six telescopic sections, namely, a lower center section, lower front and rear sections, an upper center section, and upper front and rear sections, the lower and upper front and rear end sections being adapted to telescope into the respective center sections, and all of the upper sections being adapted to slide downwardly onto the respective lower sections so as to collapse the structure into a very compact trailer which may be more easily transported on the highway. Said collapsible trailer embodies operating means for collapsing and extending its sections, this means including racks and pinions operable in response to movement of the automobile to which the trailer is connected for travel therewith, the lower center section being held stationary so as to effect relative movement of the operating means with respect to this section to effect expansion and contraction of the trailer sections.

While such a trailer is quite practical in use, it has been determined that greater simplicity in construction and operation is effected when the trailer is composed of fewer sections. It is therefore an object of my present invention to provide a collapsible trailer having only four sections, namely, a bottom front section which may be coupled to the automobile which is to pull the trailer, a bottom rear section having wheels by which the trailer may travel along a highway, the bottom front and rear sections being telescopically connected with the bottom front section having at least a portion slidable longitudinally into the bottom rear section, and upper front and rear sections which are mounted on and respectively slidable vertically with respect to the lower front and rear sections. In accordance with the present concept, the upper rear section is movable only vertically and remains longitudinally immovable with the bottom rear section during extension and contraction of the several sections, and the top front section is so mounted with respect to the bottom front section and top rear section as to move longitudinally with the bottom front section and with respect to the top rear section and vertically with respect to the bottom front section, the top front section being adapted to telescope over the bottom front section and into the top rear section to bring about this new result.

Another object of the invention is to provide a collapsible trailer, of the character referred to, in which the slidable bottom front section is adequately supported at all times from the bottom rear section, the supporting means employed for this purpose consisting of a pair of longitudinal rails extending forwardly from the bottom rear section and upon which the bottom front section is adapted to slide, the latter preferably having rollers adapted to roll along the rails to reduce frictional resistance to sliding movement of the bottom front section.

A further important object of my invention is to provide means, operative in response to relative longitudinal movement between the bottom front and rear sections, to raise and permit lowering of the top front and rear sections, this means comprising a first cable-and-pulley means operatively connected between said bottom forward section, said bottom rear section and said top rear section and operative in response to forward movement of the bottom forward section relative to said bottom rear section to raise said top rear section relative to said bottom rear section; and a second cable-and-pulley means operatively connected between said bottom rear section, said botom forward section and said top forward section, and operative to raise the latter in response to forward movement of the bottom forward section relative to said bottom rear section. By this improved operating means, the upper sections are raised uniformly with little effort, and the trailer is quickly and automatically expanded for use as a house by the simple act of retaining the bottom rear section stationary and sliding the bottom front section forwardly with respect thereto. Moreover, since manual actuation of the operating means is unnecessary by my present invention, it is apparent that the trailer may be expanded for use without the operator leaving the car and this is highly advantageous, especially during inclement weather conditions.

A further object is to provide a trailer of this type in which the upper sections are lowered under the influence of gravity, and controlled by the cables so that sudden collapsing of the sections is impossible.

A still further object is to provide a trailer in which the cable-and-pulley operating means is located wholly between the sides of the bottom and top sections so as to be concealed from view, and this is important from the standpoint of appearance and practicability since by this provision the operating elements are protected from adverse weather conditions.

Still further objects will appear from the following description, and from the drawings which are intended for the purpose of illustration only, and in which:

Fig. 4 is a sectional plan view of the trailer, the various sections being in their contracted relation;

Fig. 5 is a side elevational view of the collapsed trailer, portions of the side being broken away to illustrate the operating means;

Fig. 6 is an enlarged cross-sectional view, taken on line 6—6 of Fig. 4; and

Fig. 7 is a side view of the trailer in small scale, the various sections of the trailer being illustrated in their partly extended positions.

Figure 1:
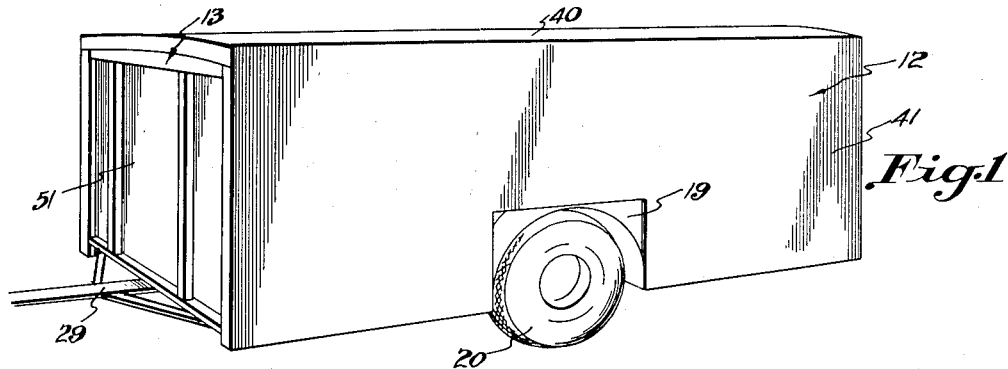
Fig. 1 is a perspective view of the trailer in collapsed condition, ready for travel along a highway.

Referring to the drawings in detail, my improved collapsible trailer includes a bottom rear section 10, a bottom front section 11, a top rear section 12 and a top front section 13, these sections being adapted to telescope, one within another, to collapse the trailer into a relatively small, compact unit which is more readily transported along a highway.

The bottom rear section 10 is of box-like shape, having a bottom or floor 14, side walls 15 and 16, and a rear wall 17. The sides of this section are reduced in width at the forward end, thus providing recesses 19 in which the supporting wheels 20 are rotatable on a transverse axle 21 (Figs. 4 and 6). The bottom 14 of the bottom rear section 13 is provided with forwardly projecting rails 22 which serve as supports for the bottom front section 11 which is constructed as next described.

The bottom front section 11 has opposite side walls 24 and a front wall 25, the top and rear of this section being open. The side walls straddle the sides of the rails 22 and a plate 26 extending between the lower edges of the side walls underlies the rails. The side walls 24 are extended rearwardly in portions 27 which are adapted to slide within the bottom rear section 10, these extensions being shaped to ride over the recessed portions of the bottom rear section as shown in Fig. 6. Preferably, the lower side edges of the extensions have rollers 28 adapted to roll upon the rails and the floor supported thereby. A long coupling bar 29 is attached to the forward end wall 25 and extends rearwardly through guide openings in crossbars 31 extending transversely between the rails 22 of the bottom rear section 10. The forward end of the bar 29 is adapted to be coupled to the rear end of an automobile by means of a suitable trailer-hitch, not herein shown.

Figure 3:
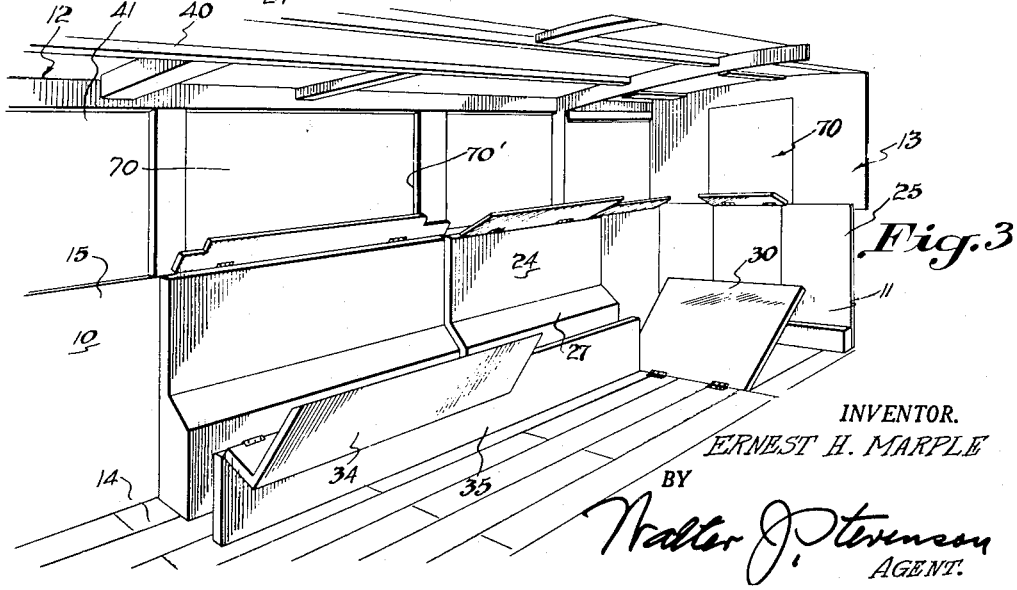
Fig. 3 is a fragmentary perspective view of the interior of the extended trailer.

It will be apparent from the foregoing that when the bottom rear section 10 is held stationary, as by means of wheel chocks or brakes applied to the wheels 20, and the automobile is driven forwardly at a slow rate, the bottom front section 11 is drawn forwardly and extended from the bottom rear section 10 to elongate the trailer. Since the front section 11 at this time extends beyond the bottom or floor of the rear section 10, a floor section 30 is pivoted to the forward end of the main floor to adapt it to be hinged downwardly and thus provide a continuation of the main floor (Fig. 3). Vertical bars 32 at the rearward ends of the extensions 27 are engageable with similar bars 33 on the forward ends of the side walls 15 to limit the forward movement of the bottom front section. To the inner surfaces of the side extensions 27 may be secured cupboards, if desired, or folding benches 34 may be hinged to vertical, longitudinally-extending pieces 35 which are carried by the floor 14 and form a passage-way between the ends of the trailer.

The top rear section 12 has a top wall or roof 40, opposite depending side walls 41 and 42, and a rear wall 43, this section having an open front and open bottom. The rear wall 43 is positioned outside the rear wall 17 of the lower section 10 and the side walls 41 and 42 straddle the side walls 15 and 16. The top rear section 12 thus telescopes over the bottom rear section 10 to adapt it for vertical movement thereon. The top rear section 12 is held against longitudinal movement with respect to the lower section 10 by reason of the proximity of the back walls 43 and 17, and vertical slide bars 44 on the section 12 which slide along the forward surfaces 45 of the portions of the section 10 forming the wheel recesses 19.

The top front section 13 has a top wall or roof 48, side walls 49 and 50 and a front wall 51. The section 13 is slidable longitudinally within the section 12, the lower edges of the side walls 41, 42, 49, and 50, having suitable guides and rollers for this purpose. Blocks 52 on the section 12 provide stops against which the rearward ends of the sides 49 and 50 engage to limit the inward sliding movement of the section 13. The side walls 49 and 50 are disposed between the sides 41 and 42 and of the section 12 and the sides 24 of the section 11 to adapt the section 13 to move vertically with respect to the section 11 and longitudinally with respect to the section 12.

Means are provided for automatically raising the section 12 as the section 11 is extended forwardly. This operating means, which is duplicated at each side of the trailer, comprises a pair of cables 55 and 56, each having a forward end attached to a stud or like anchor 57 at the forward end of the section 11. From the anchor 57 one cable 55 extends rearwardly along the side of the section 11 and passes over a pulley or sheave 58 mounted on the outer surface of that portion of the side wall 15 which is above the wheel recess 19. From the sheave 58, the cable 55 extends downwardly with its end joined to a pin 59, or the like, on the inside of the side wall 41 of the section 12. The other cable extends over a similar sheave 60 with its lower end secured to a similar pin 61.

It is thus seen that when the section 11 is drawn forwardly, it acts through the cables 55 and 56 and the sheaves 58 and 60, mounted on the fixed section 10, to raise the pins 59 and 61 and thus elevate the top rear section 12. When the section 11 is moved into the section 10, the top section 12 descends under the influence of gravity. At least the rearward end of the section 13 is carried by the section 12, and thus as the latter is elevated it acts to raise the rearward end of the section 13. Since the section 13 is moved forwardly with the section 11, the forward end of the section 13 would become unsupported, except for means to be next described.

Attached to the stationary trailer section 10 at 65 is one end of a cable 66 which extends forwardly around a pulley or sheave 67 on the forward end of the side wall 24 of the front section 11. From the sheave 67, the cable 66 extends downwardly with its end connected to a pin 68 at the lower end of a side wall 49 of the top forward section 13. This cable-and-pulley means is duplicated at the other side of the trailer. By this cable system, when the section 11 is extended forwardly with respect to the section 10, the length of cable between the sheave 67 and the pin 68 is shortened and this action causes the section 13 to be elevated. Thus, both ends of the section 13 are positively raised.

Figure 2:
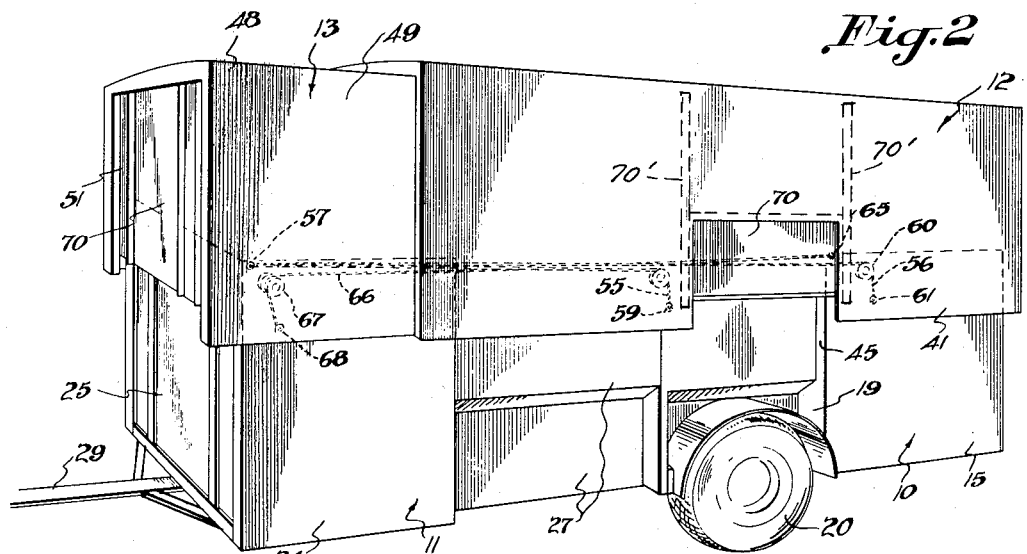
Fig. 2 is a similar view, showing the trailer in extended condition and ready for occupancy.

In accordance with usual house trailers, the sides and forward end may be provided with windows 70, slidable vertically in guides 70' and an entrance door may be located at the rear end. The side windows 70 of the rear top section are slid upwardly before the section is lowered so as to provide access to the wheels 20 from the outside of the trailer, see Figs. 1 and 2. Foldable shelves, etc., may be provided within the trailer, as illustrated in Fig. 3, for the convenience of the occupants.

Assuming that the trailer is in its collapsed condition, as shown in Figs. 1, 4, 5 and 6, a locking pin 72 extending through a hole in the floor 14 of the section 10 and a hole in the coupling bar 29 of the section 11 locks these sections together. At this time, the upper sections 12 and 13 assume their lowermost position, due to gravity, these sections being held suspended above the sections 10 and 11 by means of the cables 55, 56 and 66, which remain taut at all times.

With the various sections assuming their contracted positions, the trailer is considerably shorter than conventional, full-size house trailers, and its height is approximately half that of conventional trailers. Consequently, the collapsed trailer, being small and compact and having a low center of gravity, may be pulled more easily and parked with greater facility. In addition, due to its reduced height, the collapsed trailer can be pulled around curves at faster speeds and obstruction of view to following cars is minimized.

When it is desired to condition the trailer for occupancy, the wheels of the trailer are held stationary, by any suitable means, and the locking pin 72 is removed, after which the car is driven forwardly at a very slow speed. This action causes the bottom front section 11 to slide forwardly from the bottom rear section 10, as indicated by the arrow A in Fig. 7. At the same time, through the pulley-and-cable system 55, 56, 58, and 60, the top rear section 12 is moved upwardly only as shown by arrow B. The top forward section 13, which is caused to move both forwardly and upwardly, due to its sliding connections with the sections 11 and 12 and to the lifting action of the cable-and-pulley systems 66, 67, travels in a path which is indicated by the inclined arrow C. To retain all the sections in extended relation, the locking pin 72 may be slid into another hole located toward the rear end of the coupling bar 29 so that the automobile may be disconnected from the trailer without danger of the various trailer sections collapsing.

When the trailer is to be again moved along the highway, the car is coupled thereto and the locking pin 72 is removed, after which the car is moved rearwardly to push the trailer section 11 into the rear section 10. During this movement, the section 13 is also moved rearwardly and, due to the weight of the sections 13 and 12, the latter are permitted to descend into overlying relation to the telescoped sections 10 and 11. By reinserting the locking pin 72, all the sections are locked against extension when the automobile is driven forwardly and the trailer drawn along the highway.

It will be observed from the foregoing that my invention provides a house trailer which is capable of being collapsed to small, compact form for pulling along a roadway, the trailer being composed of four relatively movable, telescopic sections. As a particular feature of the invention, the components of the trailer are so arranged that one of the sections remains stationary as another section is slid outwardly therefrom to expand the trailer for use, the other two sections being movable vertically in response to the relative sliding movement of the first-mentioned sections. Another important feature resides in the operating means for raising the vertically movable sections, this means comprising cables and pulleys so connected between the several sections that outward longitudinal sliding movement of one of the lower sections automatically effects raising of the two upper sections of the assembly. By this provision, manual manipulation of jacks, gear and rack drives, or other elevating means, is unnecessary, and this is an important advantage since by the present operating means it is unnecessary to apply manual force to overcome friction and the weight of the various sections. Consequently, by my present improved structure, the trailer may be quickly set up for occupancy by utilizing the effort of the automobile by which the trailer is pulled along the highway.

The collapsible trailer is simple in construction and economical to manufacture so that it may be sold at a price comparable to that of conventional, non-collapsible trailers. The various sections may be sealed against rain, snow, and wind by interengaging sealing means such as those disclosed in my patent, previously referred to.

In accordance with the provisions of the patent statutes, I have described the principle of operation of my invention together with the operating means which I now consider to represent the best embodiment thereof, but I desire to have it understood that the structure shown is only illustrative and that the invention may be carried out by modified means.

I claim as my invention:

A collapsible trailer comprising: a bottom section; a top section movable vertically relative to said bottom section, said bottom and top sections having side walls, said side walls of said bottom section having recesses providing spaces; wheels located in said spaces and supporting said bottom section, said side walls of said top section having openings in their lower portions; and windows movable on said walls of said top section to a first position across said openings when said top section is in its upper position, said windows being movable to a second position above said openings to thus provide unobstructed outside access laterally to said spaces and the wheels located therein when the top section is moved to its lowermost position to align its said openings with said spaces.

References Cited in the file of this patent

UNITED STATES PATENTS

| | | |
|---|---|---|
| 1,852,984 | Smith | Apr. 5, 1932 |
| 2,122,791 | Bollstrom | July 5, 1938 |
| 2,343,261 | Marple | Mar. 7, 1944 |

FOREIGN PATENTS

| | | |
|---|---|---|
| 319,933 | Great Britain | Oct. 3, 1929 |